Figure 2:
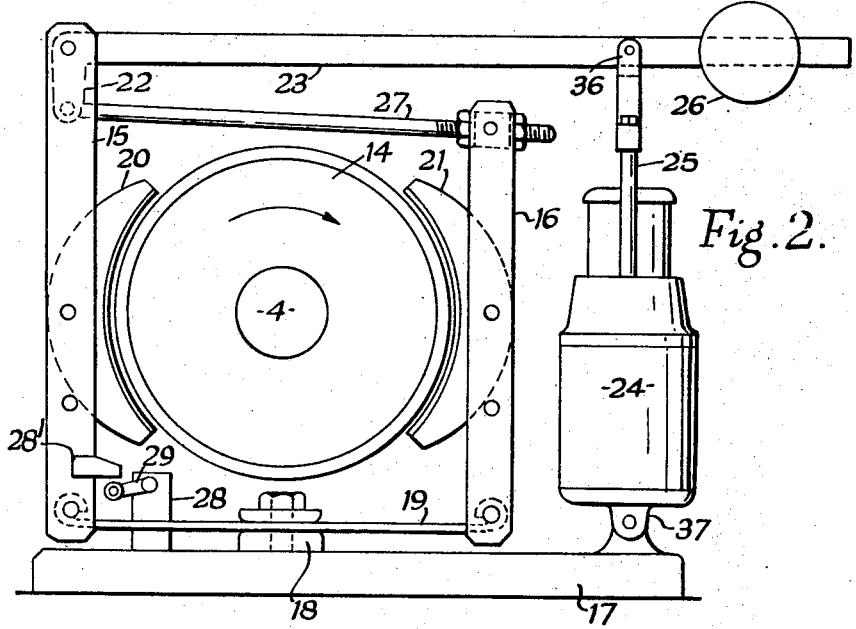

June 30, 1959 H. SINCLAIR 2,892,520
BRAKE MECHANISMS
Filed March 19, 1957 2 Sheets-Sheet 1
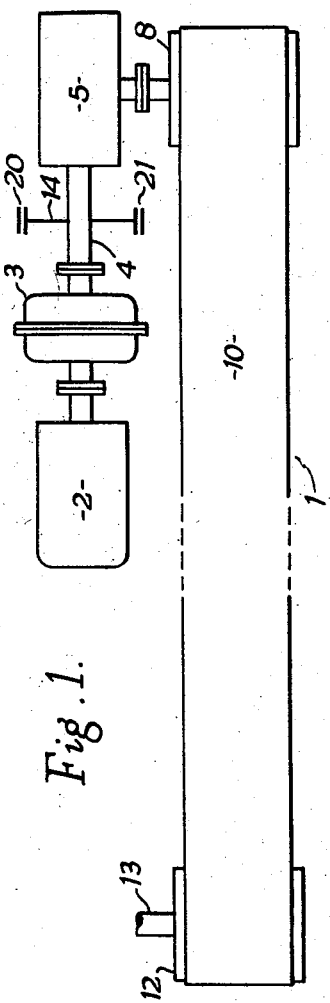
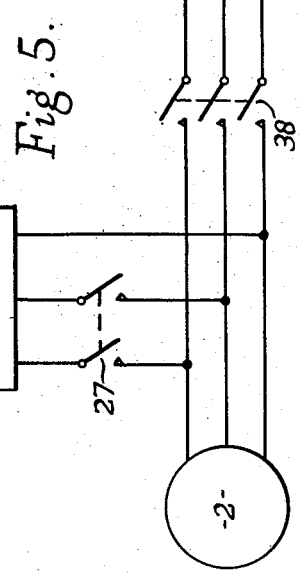
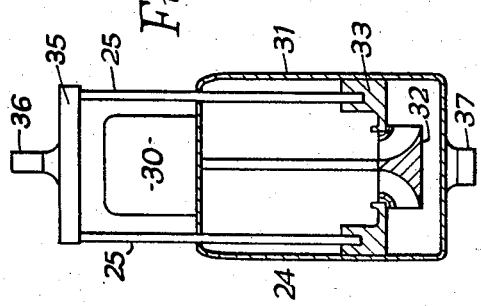
INVENTOR
Harold Sinclair
BY
Benjamin Sweedler
ATTORNEY June 30, 1959     H. SINCLAIR     2,892,520

BRAKE MECHANISMS

Filed March 19, 1957     2 Sheets-Sheet 2

INVENTOR
Harold Sinclair
BY
Benjamin Sweedler
ATTORNEY

United States Patent Office 2,892,520
Patented June 30, 1959

2,892,520

BRAKE MECHANISMS

Harold Sinclair, Windsor, England

Application March 19, 1957, Serial No. 647,138

Claims priority, application Great Britain March 22, 1956

4 Claims. (Cl. 192—2)

This invention relates to brake mechanisms for use with electric motor driven machinery for lifting loads, for example mining conveyors, which operate on a steep adverse gradient, or vertical hoisting mechanisms such as cranes, wherein a hydro-kinetic transmitter i.e., a turbo coupling or torque converter, is employed to transmit the power from the motor to the driving shaft of the machine. It is customary to provide the brake mechanism with automatic release means, actuated, for example, by a solenoid or thrustor, for holding the machine at rest when the drive is inoperative and a problem that arises in starting, due to the brief time lag while the motor accelerates and the torque of the turbo transmitter builds up, is that the machine when heavily loaded tends to run backwards if the brake is released before sufficient driving torque is being applied to the machine to sustain the load against gravity or drive it in the forward direction. If, to avoid this tendency, means, e.g. of the time delay type are provided for delaying the release of the brake until the driving torque has built up to a predetermined value, to overcome a heavy load, then the machine will accelerate too rapidly when lightly loaded.

The object of the invention is to overcome this difficulty, and in accordance with the invention there is provided automatically operated brake mechanism having auxiliary control means responsive to the torque applied to the machine by the electric motor through the turbo transmitter means whereby the said auxiliary control means effect release of the brake immediately after the said applied torque is high enough to prevent the machine from running backwards.

In order that the invention may be clearly understood and readily carried into effect it will now be described in more detail with reference to the accompanying drawings as applied to a conveyor adapted for operation on an adverse gradient, of say 1 in 3. In the drawings, Fig. 1 is a diagrammatic plan view of the conveyor, Fig. 2 is a side view on a larger scale of the said brake mechanism, showing it in released condition, Fig. 3 is a side view of the brake mechanism showing it in applied condition, Fig. 4 is a sectional view of a thrustor, and Fig. 5 is an electrical circuit diagram.

Referring to the drawings the conveyor is arranged to be driven at one or more driving points. There may be, for example, two driving points, there being two electric motors each coupled to the associated driving point through the intermediary of a hydraulic turbo coupling and appropriate speed reduction gearing. Both driving points may be provided with automatically operated brake mechanism with auxiliary control means according to the invention. Alternatively one of the brake mechanisms may include the said auxiliary control means and the release of the other brake mechanism may be automatically operated by the auxiliary control means of the first-mentioned brake mechanism. In a further alternative the other driving point may comprise a motor and turbo coupling without brake mechanism. In cases where three or more driving points are provided one of the said points may incorporate brake mechanism having the said auxiliary control means, and the other two driving points may incorporate either of the two aforementioned alternatives.

Figure 3:
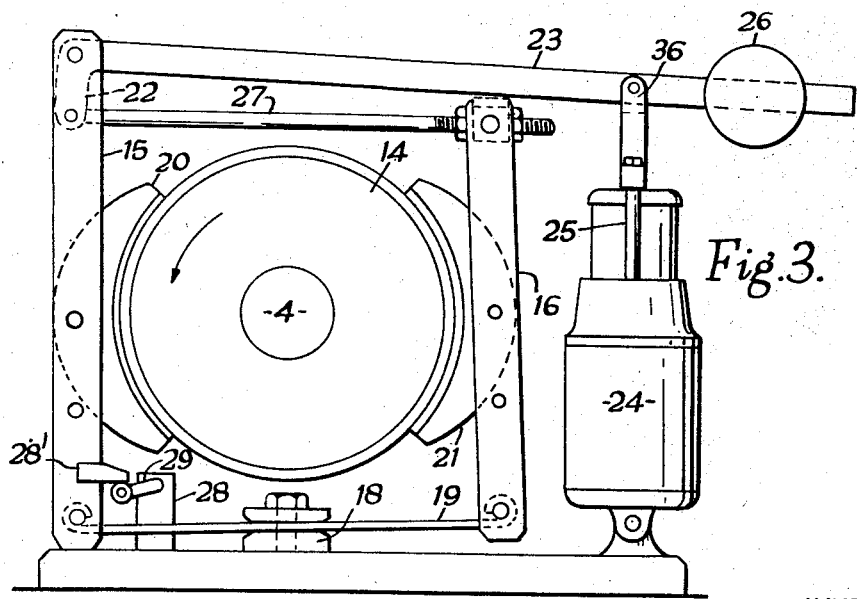

In Figs. 1 and 2, only one of the driving points is shown, viz. at the upper end of the inclined conveyor 1. The driving means shown comprises an electric motor 2, preferably of the squirrel cage type, drivably coupled to the conveyor through the intermediary of a hydraulic turbo coupling 3 coupled to the input shaft 4 of a worm reduction gear 5 connected to the driving pulley 8 of the belt conveyor 1.

The turbo coupling 3 is of the constant filling type, and starting and stopping are effected by switching the motor 2 on and off. Alternatively the turbo coupling may be of the controllable type in which provision is made for varying the degree of filling of the working circuit, for example by means of an adjustable scoop tube, in which case starting and stopping may be effected by operating the scoop control means while the motors are left running. A further possibility is to set the scoop tube in the fully engaged position and to start and stop by switching the motor on and off.

The rate of increase of driving torque will vary according to the type of turbo coupling employed and the mode of control. For example the torque will increase rapidly when the driving motor is switched on, if it is connected to a turbo coupling of constant filling type. A different rate of build up of driving torque results if the motor is left running and the scoop control means are operated to fill the working circuit of the turbo coupling, e.g. by means of a thrustor with an adjustable rate of movement. On the other hand another rate of build up of driving torque takes place if the turbo coupling is of the scoop control type (which may incorporate centrifugal valves) and the motor is switched on with the scoop in the said fully engaged position.

The conveyor 1 comprises an endless belt 10, suitably supported by guide pulleys (not shown) at appropriate intervals. When the conveyor is in operation the upper run of the belt 10 moves upwardly, and over the head pulley 8, the lower run of the belt 10 passing around a tail pulley 12 on the shaft 13.

In accordance with the invention brake mechanism, illustrated in more detail in Figs. 2 and 3, comprises a brake drum 14 mounted on the input shaft 4 and associated with brake shoes 20 and 21 supported by brake posts 15 and 16, which are operated through linkage 22, 27, 23 connected through clevis 36 to the piston rods 25 of an electro hydraulic thrustor 24 pivotally mounted at 37 on the base plate 17. The input shaft 4 of the reduction gearing is mounted in bearings above a base plate 17 which is provided with a short pedestal 18 to which is secured a strip 19 of spring steel of suitably robust proportions. The middle of the strip 19 is clamped to the pedestal 18 and the strip 19 normally projects horizontally from each side of the pedestal 18, below and beyond the drum 14 and at right angles to the axis thereof. The outer ends of the strip 19 are pivotally connected to the lower ends of the brake posts 15 and 16 located one on each side of the brake drum 14 and projecting upwardly beyond it.

The brake thrustor 24 comprises a fluid pressure servo mechanism which is operated by an internal electric motor. Referring to Fig. 5, it is energised through the main control switch 38 of the driving motor 2 being connected in series with an auxiliary brake control switch 27, to be described, so that when both switches are closed the thrustor motor is energised and the fluid pressure below the thrustor piston rises, whereupon the said piston ascends, overcoming the weight of the long lever arm 23, which is provided with a weight 26 at its outer end as shown, or with a spring, to increase its effective weight. When the thrustor motor is de-energised upon opening of the main control switch 38 the fluid pressure decreases beneath the piston and the long lever arm 23 descends, applying the brake shoes 20 and 21 to the drum 14.

The abovementioned auxiliary brake control switch, shown at 28, is mounted on the base 17, and a tappet 28' is fixed in an adjustable position to the brake post 15 so as to move vertically therewith and operate an actuating lever 29 of the auxiliary brake control switch 28, the lever 29 being biased upwardly by an internal spring to the closed position.

The operation of the brake mechanism is as follows. In the normal running condition of the conveyor, the thrustor is electrically energised, and the piston thereof is in its uppermost position so that under the action of the double-armed lever 22, 23 coupled to the piston rods 25 of the thrustor the brake posts 15 and 16 are held in positions in which the brake blocks 20 and 21 are withdrawn from the brake drum 14, and the spring steel strip 19 is in a substantially horizontal condition, so that the tappet 28' on the brake post 15 is vertically above and out of contact with the actuating lever 29 of the auxiliary brake control switch 28 which is in the closed condition.

In order to bring the conveyor 1 to rest, the motor 2 is switched off, or in cases where controllable turbo couplings are employed the scoop tubes of the couplings are adjusted so as to empty the working circuits of the turbo couplings, the motor being allowed to continue running. The main control switch 38 is then operated to de-energise the driving motor 2 and the thrustor 24, so that the piston rod 25 descends and the action of the double armed lever 22, 23 moves the brake posts 15 and 16 so as to apply the brake blocks 20 and 21 to the brake drum 14, bringing it to rest. When the conveyor 1 which is on a steep adverse gradient has stopped, the load thereon will tend to make the conveyor run back and subject to the worm reduction gear 5 being reversible in action it will in fact run back to a limited extent, the backward angular movement (anti-clockwise in Figs. 1, 2 and 3) of the brake drum 14 causing the brake blocks 20 and 21 applied to it to move with it, with flexing of the steel strip 19 until the lower end of the brake post 15 abuts against the base 17. During the downward movement of the brake post 15 the tappet 28 that it carries engages the actuating lever 29 of the auxiliary control switch 28 and moves it to the open position, the tappet 28' remaining in contact with the lever 29 during the subsequent part of the downward travel of the brake post 15. So long as the switch 28 is thus held open the thrustor will remain de-energised, even if the main switch is operated in the sense to energise the thrustor.

When it is required to start the conveyor again, the driving motor 2 is switched on by the main control switch 38, but the thrustor is not immediately energised to release the brake due to the auxiliary control switch 28 being open.

When the turbo coupling is transmitting sufficient torque to overcome the torque exerted on the brake drum 14 by the tendency of the conveyor to run backwards, the brake drum 14 will commence to rotate in the forward direction (clockwise in Figs. 1, 2 and 3) taking with it the still applied brake shoes 20 and 21, and when the tappet 28' on the brake post 15 has moved sufficiently far upwards, the actuating lever 29 of the auxiliary control switch 28 moves to the closed position under the action of the said internal spring and the thrustor 24 becomes energised. Its piston rod 25 will move upwardly so as to withdraw the brake shoes 20 and 21 from the brake drum 14 whereupon the conveyor will run in the forward direction. As soon as the brake is released the steel strip 19 resumes the condition (Fig. 2) in which it is substantially horizontal except for the slight flexure due to the weight of the brake posts 15 and 16 supported by its ends.

In the case when a normally continuously running driving motor is used together with a scoop controlled turbo coupling and the conveyor is started and stopped by operating the scoop control lever of the turbo couplings, e.g. by means of a thrustor (not shown) the brake thrustor circuit may be energised upon the closing of a control switch which energises the said scoop controlling thrustor, so that the brake thrustor will release the brake mechanism when the auxiliary switch 28 is closed by the operation of the tappet 28' in consequence of the driving torque due to the filling of the turbo coupling becoming sufficiently high to overcome the tendency of the machine to run backwards and to commence forward rotation of the shaft 4.

Fig. 4 is a diagrammatic view of the interior of the thrustor 24, which is a well-known electro-hydraulic device for applying pressure e.g. to actuate lever mechanism. As shown it comprises an electric motor 30, the shaft of which projects downwardly through an oil-filled housing 31 and carries at its lower end a centrifugal impeller 32. A piston 33 is provided with two piston rods 25 which project from the upper end of the housing 31 and are connected together at their upper ends by a bridge 35 which carries a mounting clevis 36. The housing 31 is provided with a mounting clevis 37. When the motor 30 is in operation, the impeller 32 pumps oil from the upper to the lower side of the piston 33, thereby causing the piston to rise to an upper position in which it remains so long as the motor 30 continues to run. When the motor 30 is switched off and the impeller 32 stops, oil flows from the lower to the upper side of the piston 33 through the stationary impeller, the piston 33 descending.

I claim:

1. Load lifting machinery comprising a driven member, at least one electric motor for driving said member in a forward direction, a hydro-kinetic power transmitter coupled between said motor and said driven member, a brake associated with said driven member, means to apply said brake when the load lifting machinery is stopped and means responsive to a tendency for said driven member to run back while said brake is applied to maintain said brake applied and to release said brake when the driving torque exerted by said transmitter on said driven member is just sufficient to drive said member in the forward direction.

2. Load lifting machinery comprising a driven member, at least one electric motor for driving said member in a forward direction, a hydro-kinetic power transmitter coupled between said motor and said driven member, a brake drum drivably coupled to said driven member, at least one brake shoe associated with said brake drum and biassed into engagement therewith, electrically powered means for releasing said brake, mounting means for said brake shoe, said mounting means permitting limited movement of said brake shoe with said brake drum when applied thereto, a switch in the current supply circuit of said releasing means, and switch controlling means coupled to said brake shoe, said switch controlling means opening said switch upon movement of said brake shoe with said brake drum upon movement of said brake drum in the backward direction, and said switch controlling means permitting said switch to close following a predetermined movement of said brake shoe with said brake drum in the forward direction.

3. Load lifting machinery according to claim 2 in which a main switch controls the current supply to said motor and the current supply circuit of said control means is connected to the current supply circuit of said motor between said motor and said main switch.

4. Load lifting machinery according to claim 1 comprising a brake drum drivably coupled to said driven member, brake post mechanism comprising brake posts disposed one at each side of said drum, resilient mounting means for said brake posts, brake shoes carried by said posts, a lever system interconnecting said brake shoes to control the application or release of said brake shoes, means biasing said brake posts towards one another to apply said brake shoes to said drum, electrically controlled means coupled to said lever system for moving said brake posts away from one another when said electrically controlled means are energized, a current supply circuit for said electrically controlled means, a switch in said supply circuit, and switch control means actuated from said brake post mechanism and positioned to open said switch when said driven member moves backwards with said brake shoes applied to said drum and to permit said switch to close when said driven member moves in the forward direction with the brake shoes applied.

References Cited in the file of this patent
UNITED STATES PATENTS

| | | |
|---|---|---|
| 2,274,281 | Stinson | Feb. 24, 1942 |
| 2,746,583 | Blevins | May 22, 1956 |